(12) United States Patent
Boualleg et al.

(10) Patent No.: US 10,130,942 B2
(45) Date of Patent: Nov. 20, 2018

(54) MESOPOROUS CATALYST FOR HYDROCONVERSION OF RESIDUES AND METHOD FOR PREPARING THE LATTER

(71) Applicant: IFP Energies nouvelles, Rueil-Malmaison (FR)

(72) Inventors: Malika Boualleg, Villeurbanne (FR); Bertrand Guichard, Izeaux (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 52 days.

(21) Appl. No.: 15/318,527

(22) PCT Filed: Jun. 9, 2015

(86) PCT No.: PCT/EP2015/062821
§ 371 (c)(1),
(2) Date: Dec. 13, 2016

(87) PCT Pub. No.: WO2015/189195
PCT Pub. Date: Dec. 17, 2015

(65) Prior Publication Data
US 2017/0120228 A1 May 4, 2017

(30) Foreign Application Priority Data
Jun. 13, 2014 (FR) .................................. 14 55415

(51) Int. Cl.
*B01J 27/19* (2006.01)
*B01J 37/03* (2006.01)
(Continued)

(52) U.S. Cl.
CPC ............... *B01J 27/19* (2013.01); *B01J 21/04* (2013.01); *B01J 23/24* (2013.01); *B01J 23/28* (2013.01);
(Continued)

(58) Field of Classification Search
CPC ...... B01J 37/08; B01J 35/1023; B01J 37/009; B01J 37/0207; B01J 37/031;
(Continued)

(56) References Cited

U.S. PATENT DOCUMENTS 4,267,033 A 5/1981 Heck et al.
4,422,960 A 12/1983 Shiroto et al.
(Continued)

FOREIGN PATENT DOCUMENTS

GB 2069363 A 8/1981
WO 2005028106 A1 3/2005
WO WO 2005/028106 * 3/2005

OTHER PUBLICATIONS

International Search Report for PCT/EP2015/062821 dated Sep. 9, 2015.

*Primary Examiner* — Randy Boyer
*Assistant Examiner* — Juan C Valencia
(74) *Attorney, Agent, or Firm* — Millen White Zelano and Branigan, PC; Csaba Henter

(57) ABSTRACT

The invention relates to the preparation of a catalyst containing:
 a mainly aluminum oxide calcined support;
 a hydro-dehydrogenating active phase containing at least one metal of group VIB,
the process including:
a) a first precipitation step of at least one basic precursor and at least one acidic precursor,
b) a heating step,
c) a second precipitation step by addition to the suspension of at least one basic precursor and at least one acidic precursor,
d) a filtration step;
e) a drying step,
f) a moulding step, (Continued)

g) a heat treatment step;
h) an impregnation step of the hydro-dehydrogenating active phase on the support obtained in the step g).

20 Claims, 1 Drawing Sheet

(51) Int. Cl.

| | |
|---|---|
| *B01J 21/04* | (2006.01) |
| *B01J 23/882* | (2006.01) |
| *B01J 23/883* | (2006.01) |
| *B01J 27/185* | (2006.01) |
| *B01J 27/188* | (2006.01) |
| *B01J 35/10* | (2006.01) |
| *B01J 37/02* | (2006.01) |
| *C10G 45/08* | (2006.01) |
| *B01J 37/10* | (2006.01) |
| *B01J 23/24* | (2006.01) |
| *B01J 23/28* | (2006.01) |
| *B01J 37/00* | (2006.01) |
| *B01J 35/00* | (2006.01) |
| *B01J 37/08* | (2006.01) |
| *B01J 37/20* | (2006.01) |
| *B01J 35/02* | (2006.01) |

(52) U.S. Cl.
CPC ........... *B01J 23/882* (2013.01); *B01J 23/883* (2013.01); *B01J 27/188* (2013.01); *B01J 27/1853* (2013.01); *B01J 35/0006* (2013.01); *B01J 35/1014* (2013.01); *B01J 35/1019* (2013.01); *B01J 35/1042* (2013.01); *B01J 35/1061* (2013.01); *B01J 35/1066* (2013.01); *B01J 35/1085* (2013.01); *B01J 37/009* (2013.01); *B01J 37/0009* (2013.01); *B01J 37/0201* (2013.01); *B01J 37/03* (2013.01); *B01J 37/031* (2013.01); *B01J 37/036* (2013.01); *B01J 37/038* (2013.01); *B01J 37/10* (2013.01); *C10G 45/08* (2013.01); *B01J 35/026* (2013.01); *B01J 35/109* (2013.01); *B01J 37/08* (2013.01); *B01J 37/20* (2013.01); *B01J 2523/00* (2013.01); *C10G 2300/107* (2013.01); *C10G 2300/1077* (2013.01)

(58) Field of Classification Search
CPC .. B01J 35/1028; B01J 37/0236; B01J 23/002; B01J 37/20; B01J 27/19; B01J 35/1042; B01J 37/0201; B01J 37/036; B01J 35/1014; B01J 21/04; B01J 27/188; B01J 35/1066; B01J 35/1061; B01J 35/1019; B01J 35/109; B01J 35/1047; B01J 2523/00; C10G 65/04; C10G 2300/202; C10G 2300/205; C10G 45/08
See application file for complete search history.

(56) References Cited

U.S. PATENT DOCUMENTS

| | | |
|---|---|---|
| 4,444,655 A | 4/1984 | Shiroto et al. |
| 4,460,707 A * | 7/1984 | Simpson ................. B01J 35/10 208/216 PP |
| 6,589,908 B1 | 7/2003 | Ginestra et al. |
| 7,790,652 B2 | 9/2010 | Ackerman et al. |
| 8,969,239 B2 | 3/2015 | Ginestra et al. |
| 2005/0101480 A1 | 12/2005 | Ackerman et al. |
| 2010/0276339 A1 | 4/2010 | Ginestra et al. |

* cited by examiner

MESOPOROUS CATALYST FOR HYDROCONVERSION OF RESIDUES AND METHOD FOR PREPARING THE LATTER

TECHNICAL FIELD OF THE INVENTION

The invention relates to hydrotreating catalysts having a texture and a formulation favourable for hydrodemetallation (HDM), while preserving a satisfactory hydrodesulphurisation (HDS) activity, and to their preparation and their use. The invention consists in the use of mesoporous catalysts supported on an aluminium oxide matrix comprising at least one element of group VIB and optionally of group VIII, as well as optionally the element phosphorus. It was found that this type of formulation combined with a support having specific textural properties enables maximised hydrodemetallation HDM and hydrodesulphurisation HDS performances to be obtained simultaneously in a residue hydrotreating process, particularly in a fixed bed, on feedstocks containing small amounts of metals.

PRIOR ART

The person skilled in the art knows that catalytic hydrotreating enables, by bringing a hydrocarbon feedstock into contact with a catalyst whose properties in terms of metals of the active phase and porosity have previously been suitably adjusted, enables the content of asphaltenes, metals, sulphur and other impurities of the feedstock to be significantly reduced while improving the hydrogen to carbon (H/C) ratio and converting the feedstock more or less partially into lighter cuts.

The fixed bed hydrotreating processes of residues (currently called "resid desulphurisation" unit or RDS) lead to high refining performances: typically they enable a cut to be produced having a boiling point greater than 370° C. containing less than 0.5 wt. % of sulphur and less than 20 ppm of metals from feedstock containing up to 5 wt. % of sulphur and up to 250 ppm of metals (Ni+V). The different effluents thereby obtained may serve as a basis for the production of good quality heavy fuel oils and/or pre-treated feedstocks for other units such as catalytic cracking ("fluid catalytic cracking" according to the English terminology). On the other hand, the hydroconversion of the residue into lighter cuts than the atmospheric residue (gas oil and petroleum in particular) is in general slight, typically of the order of 10-20 wt. %.

In such a process the feedstock, preferably mixed with hydrogen, flows through several fixed bed reactors arranged in series and filled with catalysts. The total pressure is typically between 100 and 200 bars (10-20 MPa) and the temperatures are between 340 and 420° C. The effluents withdrawn from the last reactor are sent to a fractionation unit.

Conventionally the fixed bed hydrotreating process consists of at least two steps (or sections). The first, so-called hydrodemetallation (HDM) step is mainly intended to remove the majority of the metals from the feedstock by using one or more hydrodemetallation catalysts. This step principally combines the operations of removing vanadium and nickel and, to a lesser extent, iron.

The second step or section, so-called hydrodesulphurisation (HDS), consists in passing the product from the first step through one or more hydrodesulphurisation catalysts, more active in terms of hydrodesulphurisation and hydrogenation of the feedstock, but less tolerant to metals.

For the hydrodemetallation (HDM) step the catalyst should be able to treat feedstocks with high contents of metals and asphaltenes, at the same time having a high hydrodemetalising ability combined with a high retention capacity for metals and a good resistance to coking. Catalysts having a bimodal pore distribution enabling high hydrodemetallation yields to be obtained have been described in U.S. Pat. No. 5,221,656. The advantage of such a pore distribution is also emphasised in the U.S. Pat. No. 5,089,463 and U.S. Pat. No. 7,119,045. The initial active phase of the catalyst used in the hydrodemetallation step generally consists of nickel and molybdenum, and optionally dopants such as phosphorus. This active phase is known to be more hydrogenating than a phase consisting of cobalt and molybdenum, which is sometimes also used, and therefore enables the formation of coke in the porosity and thus the deactivation to be limited.

For the hydrodesulphurisation (HDS) step the catalyst should have a high hydrogenolysing potential so as to produce a deep refining of the products: desulphurisation followed by demetallation, reduction of the Conradson carbon (CCR) and the asphaltenes content. Such a catalyst is characterised by a small macropore volume (U.S. Pat. No. 6,589,908). Furthermore, it is disclosed in U.S. Pat. No. 4,818,743 that the pore distribution may be mono-populated between 1 and 13 nm or bi-populated with a relative difference between the two populations that may vary from 1 to 20 nm as in U.S. Pat. No. 6,589,908. The active phase of the catalyst used in the hydrodesulphurisation step generally consists of cobalt and molybdenum, as described in the U.S. Pat. No. 6,332,976.

If the content of metals in the feedstock is too large (greater than 250 ppm) and/or if a major conversion (conversion of the heavy 540° C.$^+$ fraction or 370° C.$^+$) into a lighter 540° C.$_-$ fraction (or 370° C.$_-$) fraction is desired, boiling bed hydrotreating processes are preferred. In this type of process (cf. M. S. Rana et al, Fuel 86 (2007), p. 1216) the purification performances are less than those of RDS processes, but the hydroconversion of the residue fraction is high (of the order of 45-85 vol. %). The high temperatures that are employed, between 415 and 440° C., contribute to this high hydroconversion. The thermal cracking reactions are in fact promoted, the catalyst not generally having a specific hydroconversion function. Furthermore, the effluents formed by this type of conversion may have problems of stability (formation of sediments).

For the hydrotreating of residues the development of versatile, efficient and stable catalysts is therefore indispensable.

For boiling bed processes, patent application WO2010/002699 discloses in particular that it is advantageous to use a catalyst whose support has a median pore diameter between 10 and 14 nm and with a narrow distribution. It is stated there that less than 5% of the pore volume should be contained in the pores of size greater than 21 nm and, likewise, less than 10% of the volume should be found in the small pores of sizes less than 9 nm. The U.S. Pat. No. 5,968,348 confirms the preference of using a support whose mesoporosity remains close to 11-13 nm, with optionally the presence of macropores and a high BET surface, in this case at least 175 m$^2$/g.

For fixed bed processes, U.S. Pat. No. 6,780,817 discloses that it is necessary to use a catalyst support that has at least 0.32 ml/g of macropore volume for a stable fixed bed operation. Such a catalyst furthermore has a median diameter, in the mesopores, of 8-13 nm and a high specific surface of at least 180 m$^2$/g.

U.S. Pat. No. 6,919,294 also describes the use of so-called bimodal supports, i.e. mesoporous and macroporous supports, with the use of high macropore volumes but with a mesopore volume limited to 0.4 ml/g at most.

The U.S. Pat. No. 4,976,848 and U.S. Pat. No. 5,089,463 describe a hydrodemetallation and hydrodesulphurisation catalysts for heavy feedstocks comprising a hydrogenating active phase based on metals of groups VI and VIII and a refractory inorganic oxide support, the catalyst having specifically between 5 and 11% of its pore volume in the form of macropores and mesopores of median diameter greater than 16.5 nm.

U.S. Pat. No. 7,169,294 describes a hydroconversion catalyst for heavy feedstocks, comprising between 7 and 20% of a metal of group VI and between 0.5 and 6 wt. % of a metal of group VIII, on an alumina support. The catalyst has a specific surface between 100 and 180 $m^2/g$, a total pore volume greater than or equal to 0.55 ml/g, at least 50% of the total pore volume is contained in the pores of size greater than 20 nm, at least 5% of the total pore volume is contained in the pores of size greater than 100 nm, at least 85% of the total pore volume being contained in the pores of size between 10 and 120 nm, less than 2% of the total pore volume being contained in the pores of diameter greater than 400 nm, and less than 1% of the total pore volume being contained in the pores of diameter greater than 1000 nm.

Numerous modifications relate in particular to optimising the pore distribution of the catalyst or of mixtures of catalysts by optimising the alumina support of the catalyst.

Thus, U.S. Pat. No. 6,589,908 describes for example a process for preparing an alumina characterised by an absence of micropores, less than 5% of the total pore volume consists of pores of diameter greater than 35 nm, a high pore volume greater than 0.8 m/g, and a bimodal mesopore distribution in which the two modes are separated by 1-20 nm and the primary pore mode being larger than the median pore diameter. To this end, the described preparation method employs two precipitation steps of alumina precursors under well regulated temperature, pH and flow rate conditions. The first step is carried out at a temperature between 25 and 60° C., and a pH between 3 and 10. The suspension is then heated to a temperature between 50 and 90° C. Reactants are added again to the suspension, which is then washed, dried, moulded and calcined so as to form a catalyst support. The said support is then impregnated with a solution of active phase so as to obtain a hydrotreating catalyst; a hydrotreating catalyst for residues on a monomodal mesopore support of median pore diameter around 20 nm is described.

U.S. Pat. No. 7,790,652 describes hydroconversion catalysts that may be obtained by co-precipitation of an alumina gel, followed by introduction of metals to the obtained support by any method known to the person skilled in the art, in particular by impregnation. The catalyst obtained has a monomodal mesopore distribution with a median mesopore diameter between 11 and 12.6 nm and a pore distribution width less than 3.3 nm.

In view of the prior art, it would appear to be very difficult to obtain a catalyst having both a high total pore volume, a high mesopore volume coupled to a minimal macropore volume, a very high median diameter of the mesopores, and a hydro-dehydrogenating active phase. Furthermore, the increase of the porosity often occurs to the detriment of the specific surface and mechanical resistance.

Surprisingly, the applicant has discovered that a catalyst prepared from an alumina obtained by calcination of a specific alumina gel having a low dispersibility, by impregnation of a hydro-dehydrogenating active phase on calcined alumina, had a particularly useful pore structure while at the same time having an active phase content suitable for the hydrotreating of heavy feedstocks, in particular for hydrodemetallation reactions.

OBJECTS OF THE INVENTION

The present invention relates to the preparation of a catalyst comprising one element of group VIB, optionally at least one element of group VIII and optionally the element phosphorus supported on an aluminium oxide support having specific textural properties, in particular a high total pore volume (greater than or equal to 0.50 ml/g) and a high median diameter of the mesopores (greater than or equal to 16 nm), its BET specific surface remaining however greater than 75 $m^2/g$, preferably greater than 100 $m^2/g$, the said process comprising at least the following steps:

a) a first precipitation step, in an aqueous reaction medium, of at least one basic precursor and at least one acidic precursor in which at least one of the basic or acidic precursors comprises aluminium, at a pH of the reaction median between 8.5 and 10.5, the flow rate of the acidic and basic precursors containing aluminium is regulated so as to obtain a rate of progress of the first step of between 5 and 13%, the rate of progress being defined as the proportion of alumina formed as $Al_2O_3$ equivalent during the first precipitation step with respect to the total amount of alumina formed as $Al_2O_3$ equivalent at the end of the step c) of the preparation process, the said step operating at a temperature between 20 and 90° C. and for a period of between 2 minutes and 30 minutes;

b) a heating step of the suspension;

c) a second precipitation step of the suspension obtained at the end of the heating step b) by adding to the suspension at least one basic precursor and at least one acidic precursor in which at least one of the basic or acidic precursors includes aluminium, the relative flow rate of the acidic and basic precursors is selected so as to obtain a pH of the reaction median between 8.5 and 10.5 and the flow rate of the acidic and basic precursor or precursors containing aluminium being regulated so as to obtain a rate of progress of the second step between 87 and 95%, the rate of progress being defined as the proportion of alumina formed as $Al_2O_3$ equivalent in the said second precipitation step with respect to the total amount of alumina formed as $Al_2O_3$ equivalent at the end of the step c) of the preparation process;

d) a filtration step of the suspension obtained at the end of the second precipitation step c) so as to obtain an alumina gel;

e) a drying step of the said alumina gel obtained in stage d) in order to obtain a powder;

f) a moulding of the powder obtained at the end of the step e) so as to obtain a crude material;

g) a heat treatment step of the crude material obtained at the end of the step f) in order to obtain an aluminium oxide support;

h) an impregnation step of the hydro-dehydrogenating active phase on the said aluminium oxide support.

An advantage of the invention is to provide a new process for preparing a catalyst impregnated on an amorphous mesoporous aluminium oxide support starting from a specific alumina gel prepared according to a process comprising at least one precipitation step of at least one aluminium precursor in which between 5 and 13 wt. % of alumina only are formed in the first precipitation step, with respect to the total amount of alumina formed as $Al_2O_3$ at the end of the said preparation process of the gel, the said specific alumina gel having a dispersibility advantageously less than 15%, and preferably between 6 and 13%, and particularly preferably between 6 and 10%.

The invention also relates to the catalyst capable of being prepared by the described preparation process.

The invention finally relates to the use of this catalyst in hydrotreating or hydroconversion processes of heavy hydrocarbon feedstocks, preferably for feedstocks containing at most 50 ppm and particularly preferably between 20 and 50 ppm of cumulative metals, for example nickel and vanadium.

DESCRIPTION OF THE INVENTION

Summary

The invention relates to a process for preparing a hydroconversion catalyst comprising:
a calcined, largely aluminium oxide support;
a hydro-dehydrogenating active phase comprising at least one metal of group VIB of the Periodic Classification of the elements, optionally at least one metal of group VIII of the Period Classification of the elements, optionally phosphorus, the said catalyst having:
a $S_{BET}$ specific surface greater than 75 m²/g,
a total pore volume measured by mercury porosimetry greater than or equal to 0.55 ml/g,
a median mesopore volume diameter greater than or equal to 16 nm,
a mesopore volume as measured by mercury intrusion porosimetry greater than or equal to 0.50 ml/g,
a macropore volume less than 15% of the total pore volume;
the said process comprising at least the following steps:
a) a first precipitation step, in an aqueous reaction medium, of at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors is selected so as to obtain a pH of the reaction median between 8.5 and 10.5 and the flow rate of the acidic and basic precursor or precursors containing aluminium is regulated so as to obtain a rate of progress of the first step of between 5 and 13%, the rate of progress being defined as the proportion of alumina formed as $Al_2O_3$ equivalent during the first precipitation step with respect to the total amount of alumina formed as $Al_2O_3$ equivalent at the end of the step c) of the preparation process, the said step operating at a temperature between 20 and 90° C. and for a period of between 2 minutes and 30 minutes;
b) a heating step of the suspension at a temperature between 40 and 90° C. for a period of between 7 minutes and 45 minutes,
c) a second precipitation step of the suspension obtained at the end of the heating step b) by adding to the suspension at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid and nitric acid, in which at least one of the basic or acidic precursors includes aluminium, the relative flow rate of the acidic and basic precursors is selected so as to obtain a pH of the reaction median between 8.5 and 10.5 and the flow rate of the acidic and basic precursor or precursors containing aluminium is regulated so as to obtain a rate of progress of the second step between 87 and 95%, the rate of progress being defined as the proportion of alumina formed as $Al_2O_3$ equivalent in the said second precipitation step with respect to the total amount of alumina formed as $Al_2O_3$ equivalent at the end of the step c) of the preparation process, the said step operating at a temperature between 40 and 90° C. and for a period between 2 minutes and 50 minutes;
d) a filtration step of the suspension obtained at the end of the second precipitation step c) so as to obtain an alumina gel;
e) a drying step of the said alumina gel obtained in stage d) in order to obtain a powder;
f) a moulding of the powder obtained at the end of the step e) so as to obtain a crude material;
g) a heat treatment step of the crude material obtained at the end of the step f) at a temperature between 500 and 1000° C., in the presence or otherwise of a stream of air containing up to 60% by volume of water, in order to obtain an aluminium oxide support;
h) an impregnation step of the hydro-dehydrogenating active phase on the said aluminium oxide support.

Preferably the rate of progress of the first precipitation step a) is between 6 and 12%, most preferably between 7 and 11%.

Preferably the basic precursor is sodium aluminate.
Preferably the acidic precursor is aluminium sulphate.
Advantageously, in the first precipitation step the aqueous reaction medium is water and the said step is carried out while stirring, in the absence of organic additives.

The invention also relates to a mesoporous hydroconversion catalyst capable of being prepared by the above process.

Preferably, the said catalyst has:
a Sbet specific surface greater than 100 m²/g,
a median mesopore diameter by volume greater than or equal to 18 nm,
a mesopore volume as measured by mercury intrusion porosimetry, between 0.55 ml/g and 0.85 ml/g,
a total pore volume measured by mercury porosimetry greater than or equal to 0.60 ml/g,
a macropore volume less than 10% of the total pore volume,
an absence of micropores.

Particularly preferably the macropore volume is less than 5% of the total pore volume.

Preferably the catalyst has a median mesopore diameter by volume determined by mercury intrusion porosimetry between 20 and 25 nm.

Advantageously the content of metal of group VIB is between 6 and 14 wt. % of trioxide of metal of group VIB with respect to the total mass of the catalyst, the content of metal of group VIII is between 0.0 and 5.0 wt. % of the oxide of metal of group VIII with respect to the total mass of the catalyst, the content of the element phosphorus is between 0 and 7 wt. % of phosphorus pentoxide with respect to the total mass of the catalyst.

The hydro-dehydrogenating active phase may consist of molybdenum or nickel and of molybdenum or cobalt and molybdenum.

Preferably the hydro-dehydrogenating active phase also includes phosphorus.

The invention also relates to a process for hydrotreating a heavy hydrocarbon feedstock selected from atmospheric residues, vacuum residues obtained from direct distillation, deasphalted oils, residues obtained from conversion processes such as for example those derived from coking, a fixed bed, boiling bed or also a mobile bed hydroconversion, taken individually or as a mixture, comprising contacting the said feedstock with hydrogen and a hydroconversion catalyst as described above or prepared according to the above preparation process.

The said process may be carried out in part in a boiling bed at a temperature between 320 and 450° C., under a hydrogen partial pressure between 3 MPa and 30 MPa, at a space velocity between 0.1 and 10 volumes of feedstock per volume of catalyst and per hour, and with a ratio of gaseous hydrogen to liquid hydrocarbon feedstock advantageously between 100 and 3000 normal cubic meters per cubic meter.

The said process may be carried out at least in part in a fixed bed at a temperature between 320° C. and 450° C., under a hydrogen partial pressure between 3 MPa and 30 MPa, at a space velocity between 0.05 and 5 volumes of feedstock per volume of catalyst and per hour, and with a ratio of gaseous hydrogen to liquid hydrocarbon feedstock between 200 and 5000 normal cubic meters per cubic meter.

The said process may be a process for hydrotreating a heavy residue type hydrocarbon feedstock in a fixed bed comprising at least:
  a) a hydrodemetallation step;
  b) a hydrodesulphurisation step;
  in which the said hydroconversion catalyst is used in at least one of the said steps a) and b).

The process may in particular be a process for hydrotreating a heavy residue type hydrocarbon feedstock in a fixed bed, in which:
  the feedstock has a cumulative content of metals, initially or after prior hydrotreating on one or more other hydrodemetallation catalysts, less than or equal to 50 ppm;
  and in which the said hydroconversion catalyst is used in the hydrodemetallation step.

BRIEF DESCRIPTION OF THE FIGURES

The figure are given purely by way of illustration and relate to Example 5.

TERMINOLOGY AND CHARACTERISATION TECHNIQUES

Figure 1:
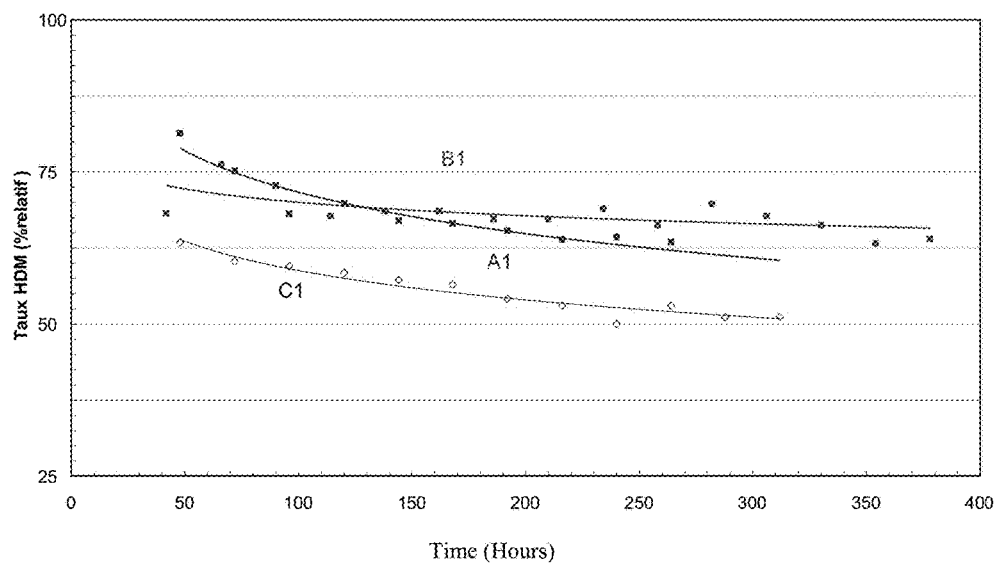
FIG. 1 shows the evolution at 300 hours of the relative hydrodemetallation HDM performances of the catalyst A1, B1, and C1 on a feedstock comprising a mixture of atmospheric residue and vacuum residue (RAAM/RSVAL, previously hydrotreated).

Throughout the following text the dispersibility is defined as the weight of solid or peptised alumina gel that cannot be dispersed by centrifugation in a polypropylene tube at 3600 G for 3 mins.

The catalyst and the support of the present invention have a specific pore distribution, in which the macropore and mesopore volumes are measured by mercury intrusion and the micropore volume is measured by nitrogen adsorption.

"Macropores" are understood to mean pores whose opening is larger than 50 nm.

"Mesopores" are understood to mean pores whose opening is between 2 nm and 50 nm, limits included.

"Micropores" are understood to mean pores whose opening is less than 2 nm.

In the following description of the invention, the term specific surface is understood to mean the BET specific surface determined by nitrogen adsorption in accordance with the ASTM standard D3663-78 derived from the Brunauer-Emmett-Teller method described in the Journal "The Journal of the American Chemical Society", 60, 309, (1938).

In the following description of the invention the total pore volume of the alumina or of the support or of the catalyst is understood to mean the volume measured by mercury intrusion porosimetry according to the ASTM standard D4284-83 at a maximum pressure of 4000 bar (400 MPa), using a surface tension of 484 dynes/cm and a contact angle of 140°. The wetting angle was taken as equal to 140° following the recommendations of the work "Techniques of the engineer, analytical treatise and characterisation", pp. 1050-5, written by Jen Charpan and Bernard Rasneur.

In order to obtain a better accuracy, the value of the total pore volume in ml/g given in the following text corresponds to the value of the total volume of mercury (total pore volume measured by mercury intrusion porosimetry) in ml/g measured on the sample less the value of the mercury volume in ml/g measured on the same sample for a pressure corresponding to 30 psi (about 0.2 MPa).

The volume of the macropores and mesopores is measured by mercury intrusion porosimetry according to the ASTM standard D4284-83 at a maximum pressure of 4000 bar (400 MPa), using a surface tension of 484 dynes/cm and a contact angle of 140°.

The value starting from which the mercury fills all the intergranular voids is fixed at 0.2 MPa, and it is considered that above this value the mercury penetrates into the pores of the sample.

The macropore volume of the catalyst or of the support is defined as being the cumulative volume of mercury introduced at a pressure between 0.2 MPa and 30 MPA, corresponding to the volume contained in the pores of apparent diameter greater than 50 nm.

The mesopore volume of the catalyst or of the support is defined as being the cumulative volume of mercury introduced at a pressure between 30 MPa and 400 MPa, corresponding to the volume contained in the pores of apparent diameter between 2 and 50 nm.

The volume of the micropores is measured by nitrogen porosimetry. The quantitative analysis of the microporosity is carried out starting from the "t" method (method of Lippens-De Boer, 1965), which corresponds to a transform of the starting adsorption isotherm as described in the work "Adsorption by powders and porous solids. Principles, methodology and applications", by S. Roukuérol, J. Roukuérol and K. Sing, Academic Press, 1999.

The median mesopore diameter is also defined as being a diameter such that all the pores of size less than this diameter make up 50% of the total mesopore volume determined by mercury intrusion porosimetry.

The median macropore diameter is also defined as being a diameter such that all the pores of size less than this diameter make up 50% of the total macropore volume determined by mercury intrusion porosimetry.

Hereinafter the groups of chemical elements are given according to the CAS classification (CRC Handbook of Chemistry and Physics, edited by CRC Press, Editor-in-Chief. R. Lide, 81$^{st}$ Edition, 2000-2001). For example, group VIII according to the CAS classification corresponds to the metals of columns 8, 9 and 10 according to the new IUPAC classification.

DETAILED DESCRIPTION OF THE INVENTION

The applicant has discovered that the combination of at least one element of group VIB, optionally at least one element of group VIII and the element phosphorus with an aluminium oxide that has at the same time a high pore volume (>0.75 ml/g), a high median diameter of the mesopores (greater than or equal to 16 nm), and thus a BET surface greater than 75 m$^2$/g, preferably greater than 100 m$^2$/g, leads to a catalyst with particular textural properties that exhibits a significantly improved hydrodemetallation in a fixed bed process or in a boiling bed process treating feedstocks advantageously having a content of cumulative metals (nickel and vanadium) less than or equal to 50 ppm. The amorphous mesoporous alumina support is obtained by moulding an alumina gel having a slight dispersibility, the said alumina gel being obtained by precipitation of at least one aluminium salt.

A large improvement in stability over time is also observed if the catalyst is used on a feedstock containing at most 50 ppm of metals, cumulatively nickel and vanadium, or on charging downstream of a first hydrodemetallation catalyst if the residues feedstock is too highly loaded.

Consequently, this type of catalyst may also be used in a sequence of catalysts in which a residues effluent is treated containing initially more than 50 ppm of metals, but in which the prior treatment by one or more catalysts of the prior art leads to a reduction in the content of metals between 20 and 50 ppm.

General Description of the Catalyst

The catalyst capable of being prepared according to the invention is in the form of a calcined largely aluminium oxide support on which are distributed the metals of the active phase. The support is the subject of specific characteristics that are described hereinafter, as are, to a lesser extent, the active phase and its formulation. Their preparation as well the use of the catalyst in processes for hydrotreating heavy hydrocarbon feedstocks are also described according to the invention further on in the description The metals of group VIB are advantageously chosen from molybdenum and tungsten, and preferably the said metal of group VIB is molybdenum.

The metals of group VIII are advantageously chosen from iron, nickel or cobalt, and nickel or cobalt, or a combination of the two, is preferred.

The respective amounts of metal of group VIB and of metal of group VIII are advantageously such that the atomic ratio of metal/metals of group VIII to metal(s) of group VIB (VIII:VIB) is between 0:1 and 0.7:1, preferably 0.05:1 and 0.7:1, particularly preferably between 0.1:1 and 0.6:1 and still more preferably between 0.2:1 and 0.5:1. This ratio may in particular be adjusted depending on the type of feedstock and the process used.

The respective amounts of metal of group VIB and of phosphorus are advantageously such that the atomic ratio of phosphorus to metal(s) of group VIB (P/VIB) is between 0.2:1 and 1.0:1, preferably between 0.4:1 and 0.9:1 and still more preferably between 0.5:1.0 and 0.85:1.

The content of metal of group VIB is advantageously between 6 and 14 wt. % of trioxide of at least one metal of group VIB with respect to the total mass of the catalyst, preferably between 7 and 12% and still more preferably between 8 and 11 wt. %.

The content of metal of group VIII is advantageously between 0 and 5.0%, preferably between 0.4 and 5.0 wt. % of the oxide of at least one metal of group VIII with respect to the total mass of the catalyst, particularly preferably between 0.6 and 3.7%, and still more preferably between 1.2 and 2.8 wt. %.

The content of the element phosphorus is advantageously between 0 and 7.0 wt. %, preferably between 0.6 and 7.0 wt. % of phosphorus pentoxide with respect to the total mass of the catalyst, particularly preferably between 1.4 and 5.3 wt. % and still more preferably between 2.0 and 4.6 wt. %.

The porous alumina oxide constituting the major proportion of the support of the said catalyst according to the invention is characterised by a content of alumina greater than or equal to 90% and a content of silica as SIO$_2$ equivalent of at most 10% with respect to the final oxide, preferably by a content of silica of less than 5 wt. %, particularly preferably a content less than 2%, and still more preferably the oxide contains nothing other than alumina.

The said catalyst according to the invention is generally available in all the forms known to the person skilled in the art. Preferably it will consist of extrudates of diameter generally between 0.5 and 10 nm, preferably between 0.8 and 3.2 nm and most preferably between 1.0 and 2.5 nm. The catalyst may advantageously exist in the form of cylindrical, trilobed or quadrilobed extrudates. Preferably its shape will be trilobed or quadrilobed. The shape of the lobes will be able to be adjusted according to all the known methods of the prior art.

Characteristics of the Support According to the Invention

The support of the catalyst according to the invention mainly comprises a porous aluminium oxide. Preferably the support consists exclusively of alumina.

The porous aluminium oxide support of the said catalyst according to the invention generally has a content of alumina greater than or equal to 90% and a content of silica as SIO$_2$ equivalent of at most 10 wt. % with respect to the final oxide, preferably a content of silica less than 5 wt. %, and particularly preferably a content less than 2 wt. %.

The silica may be introduced by any technique known to the person skilled in the art, for example during the synthesis of the alumina gel or during the co-kneading step.

The support used for the preparation of the catalyst according to the invention advantageously has a total pore volume (TPV) of at least 0.75 ml/g, preferably at least 0.78 ml/g and particularly preferably at least 0.8 ml/g.

The support used according to the invention advantageously has a macropore volume, $V_{50\ nm}$, defined as the volume of the pores of diameter greater than 50 nm, of less than 10% of the total pore volume and preferably less than 5% of the total pore volume, and particularly preferably less than 3% of the total pore volume.

The support used according to the invention advantageously has a mesopore volume, $V_{meso}$, defined as the volume of the pores of diameter between 2 and 50 nm, of at least 0.50 ml/g and preferably at least 0.7 ml/g, and particularly preferably between 0.70 and 0.90 ml/g.

The median mesopore diameter of the support (or $D_{pmeso}$) is advantageously greater than or equal to 16 nm, preferably greater than or equal to 18 nm, particularly preferably greater than or equal to 20 nm, and still more preferably between 21 nm and 23 nm, limits included.

The support of the catalyst used according to the present invention advantageously has a BET specific surface (SS)

greater than 75 m²/g, preferably greater than 100 m²/g, particularly preferably greater than 130 m²/g. The BET surface is understood to mean the specific surface determined by nitrogen adsorption in accordance with the ASTM standard D3663-78 established according to the Brunauer-Emmett-Teller method described in the Journal "The Journal of the American Chemical Society", 60, 309, (1938).

Characteristics of the Catalyst

The finished catalyst, that is to say with the metals deposited on the surface by any method known to the person skilled in the art, as is described hereinafter, consequently has the texture properties that must be observed.

The catalyst according to the invention advantageously has a total pore volume (TPV) of at least 0.55 ml/g and preferably at least 0.60 ml/g as determined by mercury intrusion porosimetry. In a preferred embodiment the catalyst has between 0.60 and 0.85 ml/g of total pore volume, limits included.

The catalyst use according to the invention advantageously has a macropore volume, $V_{50}$ nm, of less than 15% of the total volume and preferably less than 10% of the total pore volume. In a particularly preferred embodiment the macropore volume represents less than 5% of the total pore volume.

The mesopore volume, $V_{meso}$, of the catalyst is at least 0.50 ml/g, and is preferably between 0.55 ml/g and 0.85 ml/g, and particularly preferably between 0.60 ml/g and 0.80 ml/g, limits included.

The median mesopore diameter ($D_{pmeso}$) is advantageously greater than or equal to 16 nm, preferably greater than or equal to 18 nm, and particularly preferably greater than or equal to 20 nm.

Advantageously the median mesopore diameter ($D_{pmeso}$) of the catalyst is between 20 nm and 28 nm and preferably between 20 and 25 nm, limits included.

If macropores are present, the median macropore diameter is advantageously between 60 and 200 nm, preferably between 60 and 120 nm.

The catalyst used according to the present invention advantageously has a BET specific surface (SS) of at least 75 m²/g, preferably at least 100 m²/g and particularly preferably between 110 and 150 m²/g.

Preparation of the Oxide Support of the Catalyst

The porous aluminium oxide used in the support of the catalyst according to the present invention is a porous aluminium oxide with a controlled mesoporosity exhibiting a good thermal and chemical stability, and having a focused, uniform, monomodal and regulated size distribution of the mesopores.

The porous aluminium oxide used according to the invention advantageously has a specific surface and a pore volume and in particular calibrated mesopores.

Preferably the mesoporous aluminium oxide is advantageously free from micropores.

Preferably the porous aluminium oxide advantageously has a specific surface greater than 75 m²/g.

Particularly preferably the specific surface of the porous aluminium oxide is greater than 100 m²/g.

Most preferably the specific surface of the porous aluminium oxide is greater than 125 m²/g.

The mesopore volume, defined as being the volume contained in the pores having a mean diameter between 2 and 50 nm, is measured by mercury porosimetry. According to the invention the mesopore volume of the porous aluminium oxide is greater than or equal to 0.5 ml/g, particularly preferably greater than or equal to 0.7 ml/g, and most preferably between 0.70 ml/g and 0.90 ml/g, limits included.

The porous aluminium oxide support of the said catalyst according to the invention generally includes a content of alumina greater than or equal to 90% and a content of silica of at most 10 wt. % as $SiO_2$ equivalent with respect to the final oxide, preferably a content of silica less than 5 wt. %, particularly preferably a content less than 2 wt. %. The silica may be introduced by any technique known to the person skilled in the art, for example during the synthesis of the alumina gel or during the co-kneading step.

Preferably the aluminium oxide support according to the invention consists exclusively of alumina.

Particularly preferably the aluminium oxide support according to the invention is a non-mesostructured alumina.

The process for preparing the porous aluminium oxide support of the catalyst according to the invention comprises a first precipitation step a), a heating step b), a second precipitation step c), a filtration step d), a drying step e), a moulding step f), and a heat treatment step g).

The rate of progress for each of the precipitation steps is defined as being the proportion of alumina formed as $Al_2O_3$ equivalent during the said first or second precipitation step compared to the total amount of alumina formed as $Al_2O_3$ equivalent at the end of the two precipitation steps and more generally at the end of the preparation steps of the alumina gel and in particular at the end of the step c) of the preparation process according to the invention.

Step a): First Precipitation

This step consists in contacting, in an aqueous reaction medium, at least one basic precursor chosen from sodium aluminate, potassium aluminate, ammonia, sodium hydroxide and potassium hydroxide, and at least one acidic precursor chosen from aluminium sulphate, aluminium chloride, aluminium nitrate, sulphuric acid, hydrochloric acid, and nitric acid, in which at least one of the basic or acidic precursors comprises aluminium, the relative flow rate of the acidic and basic precursors is chosen so as to obtain a pH of the reaction medium between 8.5 and 10.5 and the flow rate of the acidic and basic precursor or precursors containing aluminium is controlled so as to obtain a rate of progress of the first step between 5 and 13%, the rate of progress being defined as the proportion of alumina formed as $Al_2O_3$ equivalent during the said first precipitation step with respect to the total amount of alumina formed as $Al_2O_3$ equivalent at the end of the step c) of the preparation process, the said step operating at a temperature between 20 and 90° C., and for a period of between 2 minutes and 30 minutes.

The mixture in the aqueous reaction medium of at least one basic precursor and at least one acidic precursor requires that at least one of the acidic or basic precursors includes aluminium. It is also possible that at least two of the basic and acidic precursors include aluminium.

The basic precursors comprising aluminium are sodium aluminate and potassium aluminate. The preferred basic precursor is sodium aluminate. The acidic precursors comprising aluminium are aluminium sulphate, aluminium chloride and aluminium nitrate. The preferred acidic precursor is aluminium sulphate.

Preferably the aqueous reaction medium is water.

Preferably the said step a) is carried out while stirring.

Preferably the said step a) is carried out in the absence of organic additive.

The acidic and basic precursors, whether or not they contain aluminium, are mixed, preferably in solution, in the aqueous reaction medium, in proportions such that the pH of the resultant suspension is between 8.5 and 10.5.

In accordance with the invention the acidic alumina precursors and the basic alumina precursors may be used individually or as a mixture in the precipitation step.

In accordance with the invention the relative flow rate of the acidic and basic precursors, whether or not they contain aluminium, is chosen so as to obtain a pH of the reaction medium between 8.5 and 10.5.

In the preferred case in which the basic and acidic precursors are respectively sodium aluminate and aluminium sulphate, the mass ration of the said basic precursor to the said acidic precursor is advantageously between 1.60 and 2.05.

For the other basic and acidic precursors, whether or not they contain aluminium, the base/acid mass ratios are determined by a neutralisation curve of the base by the acid. Such a curve is easily obtained by the person skilled in the art.

Preferably the said precipitation step a) is carried out at the pH between 8.5 and 10.0 and particularly preferably between 8.7 and 9.9.

Preferably the first precipitation step a) is carried out at a temperature between 20 and 90° C., preferably between 20 and 70° C. and particularly preferably between 30 and 50° C.

Preferably the first precipitation step a) is carried out at a pH between 8 and 10.5, preferably between 8 and 10.5, preferably between 8.5 and 10, and particularly preferably between 8.7 and 9.9.

Preferably the first precipitation step a) is carried out for a period of between 5 and 20 minutes, and preferably 5 to 15 minutes.

According to the invention the rate of progress of the said first precipitation step a) is between 5 and 13%, preferably between 6 and 12%, and preferably between 7 and 11%. The rate of advancement is defined as being the proportion alumina formed as $Al_2O_3$ equivalent during the said first precipitation step with respect to the total amount of alumina formed as $Al_2O_3$ equivalent at the end of the step c) of the preparation process.

The acidic and basic precursors containing aluminium are therefore introduced in amounts enabling a suspension to be obtained containing the desired amount of alumina, depending on the final alumina concentration that is to be achieved. In particular the said step a) enables 5 to 13 wt. % of alumina with respect to the total amount of alumina formed as $Al_2O_3$ equivalent at the end of the step c) of the preparation process, to be obtained.

Step b): Heating

In accordance with the invention the said preparation process comprises a heating step b) of the suspension obtained at the end of the first precipitation step a).

According to the invention, before the second precipitation step is carried out, a heating step of the suspension obtained at the end of the precipitation step a) is carried out between the two precipitation steps.

Preferably the said heating step of the suspension obtained at the end of the step a), carried out between the said first precipitation step a) and the second precipitation step c), operates at a temperature between 40 and 90° C., preferably between 40 and 80° C., particularly preferably between 40 and 70° C. and most particularly preferably between 40 and 65° C.

Preferably the said heating step is carried out for a period of between 7 and 45 minutes and preferably between 7 and 35 minutes.

The said heating step is advantageously carried out according to all the heating methods known to the person skilled in the art.

Step c): Second Precipitation

According to the invention the said preparation process comprises a second precipitation step of the heated suspension obtained at the end of the heating step b), the said second step operating by addition to the said suspension of at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid, and nitric acid, in which at least one of the basic or acidic precursors comprises aluminium, the relative flow rate of the acidic and basic precursors is selected so as to obtain a pH of the reaction medium between 8.5 and 10.5, and the flow rate of the acidic and basic precursor or precursors containing aluminium is regulated so as to obtain a rate of progress of the second step between 87 and 95%, the rate of progress being defined as the proportion of alumina formed as $Al_2O_3$ equivalent during the said second precipitation step with respect to the total amount of alumina formed as $Al_2O_3$ equivalent at the end of the step c) of the preparation process, the said step operating at a temperature between 40 and 90° C., and for a period of between 2 minutes and 50 minutes.

The basic and acidic precursor or precursors are added in the said second co-precipitation step in aqueous solution.

As in the first precipitation step a), the addition to the heated suspension of at least one basic precursor and at least one acidic precursor requires that at least one of the basic or acidic precursors contains aluminium. It is also possible that at least two of the basic and acidic precursors contain aluminium.

The basic precursors containing aluminium are sodium aluminate and potassium aluminate. The preferred basic precursor is sodium aluminate.

The acidic precursors containing aluminium are aluminium sulphate, aluminium chloride and aluminium nitrate. The preferred acidic precursor is aluminium sulphate.

Preferably the said second precipitation step is carried out while stirring.

Preferably the said second step is carried out in the absence of organic additive.

The acidic and basic precursors, whether or not they contain aluminium, are mixed, preferably in solution, in the suspension, in proportions such that the pH of the resultant suspension is between 8.5 and 10.5.

In the same way as in the precipitation step a), the relative flow rate of the acidic and basic precursors, whether or not they contain aluminium, is selected so as to obtain a pH of the reaction medium between 8.5 and 10.5, preferably between 8.5 and 10, particularly preferably between 8.7 and 9.9.

In the preferred case in which the basic and acidic precursors are respectively sodium aluminate and aluminium sulphate, the mass ratio of the said basic precursor to the said acidic precursor is advantageously between 1.60 and 2.05.

For the other basic and acidic precursors, whether or not they contain aluminium, the base/acid mass ratios are determined by a neutralisation curve of the base by the acid. Such a curve is easily obtained by the person skilled in the art.

Preferably the said second precipitation step is carried out at a pH between 8.5 and 10.0, and preferably between 8.7 and 9.9.

The aluminium precursors are also mixed in amounts enabling a suspension to obtained containing the desired amount of alumina, depending on the final concentration of alumina to be reached. In particular, the said second precipitation step enables 87 to 95 wt. % of alumina with respect to the total amount of alumina formed as $Al_2O_3$ equivalent at the end of the two precipitation steps, to be obtained.

As in the precipitation step a), it is the flow rate of the acidic and basic precursor or precursors containing aluminium that is regulated so as to obtain a rate of progress of the second step between 87 and 95%, preferably between 88 and 94%, particularly preferably between 89 and 93%, the rate of progress being defined as the proportion of alumina formed as $Al_2O_3$ equivalent during the said second precipitation step with respect to the total amount of alumina formed as $Al_2O_3$ equivalent at the end of the step c) of the preparation process.

Thus, depending on the intended concentration of alumina at the end of the precipitation steps, preferably between 20 and 100 g/l, the amounts of aluminium that have to be introduced by the acidic and/or basic precursors are calculated and the flow rate of the precursors is adjusted depending on the concentration of the said added aluminium precursors, on the amount of water added to the reaction medium, and on the required rate of progress for each of the precipitation steps.

Just as in the precipitation step a), the flow rates of the acidic and/or basic precursor or precursors containing aluminium depend on the size of the reactor that is used and thus on the amount of water added to the reaction medium.

By way of example, if a 3 liter capacity reactor is employed and the aim is 1 liter of alumina suspension of final $Al_2O_3$ concentration of 50 g/l, with a target rate of progress of 10% for the first precipitation step, then 10% of the total alumina should be introduced during the precipitation step a). The alumina precursors are sodium aluminate in a concentration of 155 g/l as $Al_2O_3$ and aluminium sulphate at a concentration of 102 g/l as $Al_2O_3$. The precipitation pH of the first step is fixed at 9.5 and the pH of the second step at 9. The amount of water added to the reactor is 620 ml.

For the first precipitation step a) operating at 30° C. and for 8 minutes, the flow rate of aluminium sulphate should be 2.1 ml/min and the flow rate of sodium aluminate is 2.6 ml/min. The mass ratio of sodium aluminate to aluminium sulphate is therefore 1.91.

For the second precipitation step, operating at 70° C. for 30 minutes, the flow rate of aluminium sulphate should be 5.2 ml/min and the flow rate of sodium aluminate is 6.3 ml/min. The mass ratio of sodium aluminate to aluminium sulphate is thus 1.84.

Preferably the second precipitation step is carried out at a temperature between 40 and 80° C., preferably between 45 and 70° C. and particularly preferably between 50 and 70° C.

Preferably the second precipitation step is carried out for a period of between 5 and 45 minutes, preferably 7 to 40 minutes.

The second precipitation step enables in general an alumina suspension to be obtained having an $Al_2O_3$ concentration between 20 and 100 g/l, preferably between 20 and 80 g/l, preferably between 20 and 50 g/l.

Step d): Filtration

The process for preparing alumina according to the invention also includes a filtration step of the suspension obtained at the end of the second precipitation step c). The said filtration step is carried out according to methods known to the person skilled in the art.

The filtrability of the suspension obtained at the end of the two precipitation steps is improved by the low dispersibility of the obtained alumina, which enables the productivity of the process according to the invention to be improved and also allows the process to be scaled up to an industrial scale.

The said filtration step is advantageously followed by at least one washing step, preferably with water, and preferably one to three washing steps, with an amount of water equal to the amount of filtered precipitate.

The combination of the first precipitation step a), heating step b) and second precipitation step c) and the filtration step d) enables a specific alumina gel to be obtained having a degree of dispersibility less than 15%, preferably between 5 and 15% and preferably between 6 and 14% and particularly preferably between 7 and 13%, and most particularly preferably between 7 and 10%, and a crystallite size between 1 and 35 nm and preferably between 2 to 35 nm.

The alumina gel obtained also advantageously has a sulphur content measured by the X-ray florescence method, of between 0.001 and 2 wt. % and preferably between 0.01 and 0.2 wt. %, and a sodium content, measured by ICP-MS or inductively coupled plasma spectrometry of between 0.001 and 2 wt. %, and preferably between 0.01 and 0.1 wt. %, the percentages by weight being expressed with respect to the total mass of the alumina gel.

In particular the alumina gel or the boehmite in the form of powder according to the invention consists of crystallites whose size, obtained by the Scherrer X-ray diffraction formula, is respectively between 2 and 20 nm and between 2 and 35 nm along the crystallographic directions [020] and [120].

Preferably the alumina gel according to the invention has a crystallite size along the crystallographic direction [020] of between 1 to 15 nm and a crystallite size along the crystallographic direction [120] between 1 to 35 nm.

X-ray diffraction of the alumina gels or boehmites was carried out using the conventional powder methods by means of a diffractometer. The Scherrer formula is a formula used in X-ray diffraction of powders or polycrystalline samples that relates the mid-height size of the diffraction peaks to the size of the crystallites. It is described in detail in the reference: Appl. Cryst. (1978), 11, 103-113 "Scherrer after 60 years: A survey and some new results in the determination of crystallite size", J. I. Langford and A. J. C. Wilson.

The low level of dispersibility of the thus prepared gel facilitates the moulding step of the said gel according to all the methods known to the person skilled in the art and in particular by kneading extrusion, by granulation and by the so-called oil drop technique according to the English terminology.

Step e): Drying

In accordance with the invention the alumina gel obtained at the end of the second precipitation step c), followed by a filtration step d), is dried in a drying step e) so as to obtain a powder, the said drying step being carried out for example by drying at a temperature between 20 and 200° C. and for a period of between 8 h an 15 h, or by spraying or by any other drying technique known to the person skilled in the art.

In the case where the said drying step e) is carried out by spraying, the cake obtained at the end of the second precipitation, followed by a filtration step, is re-suspended. The said suspension is then atomised into fine droplets, in a vertical cylindrical container in contact with a current of hot air so as to evaporate the water according to the principle well known to the person skilled in the art. The powder obtained is entrained by the heat flow to a cyclone or a sleeve filter, which separates the air from the powder.

Preferably in the case where the said drying step e) is carried out by spraying, the spraying is performed according to the operating procedure described in the publication Asep Bayu Dani Nandiyanto, Kikuo Okuyama, Advanced powder technology, 22, 1-19, 2011.

Step f): Moulding

In accordance with the invention the powder obtained at the end of the drying step e) is moulded in a step f) so as to obtain a crude material.

Crude material is understood to mean the moulded material that has not undergone any heat treatment steps.

Preferably the said moulding step f) is carried out by kneading extrusion, by granulation, by the oil drop technique, or by pelleting.

Particularly preferably the said moulding step f) is carried out by kneading extrusion.

Step q): Heat Treatment

In accordance with the invention the crude material obtained at the end of the moulding step f) then undergoes a het treatment step g) at a temperature between 500 and 1000° C., in the presence or otherwise of a flow of air containing up to 60% by volume of water.

Preferably the said heat treatment step g) is carried out at a temperature between 540° C. and 900° C.

Preferably the said heat treatment step g) is carried out for a period of between 2 hours and 10 hours.

The said heat treatment step g) enables the boehmite to be transformed to the final alumina.

The heat treatment step may be preceded by a drying at a temperature between 50° C. and 200° C., according to any technique known to the person skilled in the art.

Characteristics of the Obtained Amorphous Porous Aluminium Oxide

The preparation process according to the invention enables an amorphous porous aluminium oxide to be obtained having a large median pore diameter, determined on the pore volume distribution curve by mercury intrusion porosimetry, advantageously greater than or equal to 16 nm, preferably greater than or equal to 18 nm, particularly preferably greater than or equal to 20 nm, and most particularly preferably between 21 and 23 nm, limits included.

The mesoporous aluminium oxide support prepared according to the process of the invention is advantageously free from micropores. The absence of micropores is verified by nitrogen porosimetry.

The mesoporous aluminium oxide support according to the invention advantageously has a mesopore volume, that is to say contained in the pores of diameter between 2 and 50 nm, as measured by mercury intrusion porosimetry, greater than or equal to 0.5 ml/g, preferably greater than or equal to 0.7 ml/g.

The total pore volume measured by mercury porosimetry is advantageously greater than 0.75 ml/g.

The mesoporous aluminium oxide support according to the invention generally comprises a proportion of macropores, defined as the pores of diameter greater than 50 nm, of less than 10%, preferably less than 5% of the total pore volume determined by mercury porosimetry.

The mesoporous aluminium oxide support according to the invention generally has a specific surface greater than 100 m2/g.

The support of the catalyst according to the invention comprises for the most part (at least 90 wt. %) an aluminium oxide as described above and may also contain dopants such as the elements silicon, titanium and zirconium (up to a content of 10 wt. %).

The support of the catalyst according to the invention described above generally used in the form of powder, spheres, pellets, granules or extrudates, the moulding operations being carried out according to conventional techniques known to the person skilled in the art.

The support of the catalyst according to the invention consisting mainly of the aluminium oxide described above may undergo a supplementary heat treatment or hydrothermal treatment. Heat treatment or hydrothermal treatment is understood to mean heat treating the support either in the absence or in the presence of water. In the latter case the contact with the water vapour may take place at atmospheric pressure (steaming) or at autogenic pressure (autoclaving). Several combined cycles of heat treatments or hydrothermal treatments may be carried out. The temperature of the said treatments is between 200 and 1000° C., preferably between 450 and 1000° C. and particularly preferably between 600 and 850° C.

In the case of hydrothermal treatment, the water content is preferably between 150 and 900 grams per kilogram of dried air, and particularly preferably between 250 and 650 grams per kilogram of dry air.

Preparation of the Catalyst

The catalyst according to the invention is obtained by deposition of at least one metal of group VIB, optionally at least one metal of group VIII and optionally other elements such as the element phosphorus, on the catalyst support according to the invention described above.

The said deposition may be carried out by all the methods known to the person skilled in the art.

In particular, the said deposition on the previously described alumina may be carried out by the whole range of impregnation methods known to the person skilled in the art, including dry impregnation. Preferably at least one metal of group VIB, optionally at least one metal of group VIII and optionally the element phosphorus are deposited by dry impregnation of their associated compounds on the oxide support according to the invention. The deposition may take place via a single dry impregnation step of the oxide support according to the invention via the use of a solution containing at the same time at least one compound of at least one metal of group VIB, optionally at least one phosphorus-containing compound, and optionally at least one compound of at least one metal of group VIII.

The deposition may also advantageously be carried out via at least two dry impregnation cycles. The different elements may thus be advantageously impregnated in succession or else one of the elements may also be impregnated in several sequences. One of the impregnations that is carried out may in particular serve for the use of an organic compound that the person skilled in the art wishes to introduce in addition to the constituent elements of the final catalyst.

The said solution or solutions may be aqueous, may consist of an organic solvent, or else of a mixture of water and at least one organic solvent (for example ethanol or toluene). Preferably the solution is aqueous-organic and more preferably is aqueous-alcoholic. The pH of this solution may be adjusted by the optional addition of an acid.

Among the compounds that may be introduced into the solution as sources of elements of group VIII, the following may advantageously be mentioned: citrates, oxalates, carbonates, hydroxy carbonates, hydroxides, phosphates, sulphates, aluminates, molybdates, tungstates, oxides, nitrates, halides, for example chlorides, fluorides, bromides, acetates, or any mixture of the compound enumerated here.

As regards the sources of the element of group VIB that are well known to the person skilled in the art, the following for example figure advantageously for molybdenum and tungsten: oxides, hydroxides, molybdic and tungstic acids and their salts, in particular ammonium salts, ammonium heptamolybdate, ammonium tungstate, phosphomolybdic acid, phosphotungstic acid and their salts. The oxides or the ammonium salts such as ammonium molybdate, ammonium heptamolybdate or ammonium tungstate are preferably used.

The preferred source of phosphorus is orthophosphoric acid, but its salts and esters such as the alkaline phosphates, ammonium phosphate, gallium phosphate or alkyl phosphates are also suitable. Phosphorous acids, for example hypophosphorous acid, phosphomolybdic acid and its salts, phosphotungstic acid and its salts, may advantageously be used.

An organic chelating agent may advantageously be added to the solution if the person skilled in the art considers this necessary.

Preferably the whole of the metallic phase is introduced at the end of the preparation of the support and no additional step is therefore necessary.

It is preferred to choose to impregnate in one go at least one metal of group VIB, optionally at least one metal of group VIII and optionally the element phosphorus on the previously obtained aluminium oxide support, irrespective of which of the previously described impregnation methods is used.

The product is then generally aged, dried and optionally calcined in an oxidising atmosphere, for example in air, normally at a temperature of about 300 to 600° C., preferably 350 to 550° C.

In one embodiment the catalyst according to the invention undergoes a supplementary heat treatment step (calcination).

Preferably this treatment is generally carried out in two stages. In a first stage the solid is dried at a temperature below 200° C. in air, preferably below 150° C. In a second stage a calcination is carried out in air, without extra addition of water, at a temperature preferably between 300 and 600° C., and particularly preferably between 400 and 400° C.

In another embodiment the catalyst does not undergo an extra heat treatment or hydrothermal treatment step, and the catalyst is only advantageously dried. In this case the drying temperature is below 200° C.

The catalyst according to the present invention is advantageously used in a totally or partially sulphurised form. It then undergoes before use an activation step in a sulphoreducing atmosphere according to any method known to the person skilled in the art, either in situ or ex situ.

The sulphurisation treatment may be carried out ex situ (before adding the catalyst to the hydrotreating/hydroconversion reactor) or in situ by means of an organo-sulphur precursor agent of H2S, for example DMDS (dimethyl disulphide).

Process of Use of the Catalyst According to the Invention

The invention describes the use of a catalyst comprising at least one metal of group VI B, optionally at least one metal of group VIII, optionally phosphorus, and an aluminium oxide support, in a process for hydrotreating heavy feedstocks such as petroleum residues (atmospheric or vacuum residues).

The invention advantageously relates to feedstocks having a content of metals, nickel and vanadium, less than 50 ppm, irrespective of the process of use and the published target of performances. This feedstock may be obtained from a pretreatment step carried out on any catalyst.

The processes according to the invention advantageously employ the catalyst described according to the invention in hydrotreating processes enabling heavy hydrocarbon feedstocks containing sulphur impurities and metallic impurities to be converted.

In general, the hydrotreating processes enabling heavy hydrocarbon feedstocks containing sulphur impurities and metallic impurities to be converted operate at a temperature between 320 et 450° C., under a hydrogen partial pressure between 3 MPa et 30 MPa, at a spatial velocity advantageously between 0.05 et 10 volumes of feedstock per volume of catalyst and per hour, and with a ratio of gaseous hydrogen to liquid hydrocarbon liquid feedstock advantageously between 100 et 5000 normal cubic meters cubes per cubic meter.

An aim investigated by the use of the catalysts of the present invention relates to an improvement of in particular hydrodemetallation performances compared to the catalysts known in the prior art. The described catalyst provides an improvement in hydrodemetallation and in hydrodeasphaltation compared to conventional catalysts, while exhibiting a good stability over time.

Feedstocks

The feedstocks treated in the process according to the invention are advantageously chosen from atmospheric residues, vacuum residues obtained from direct distillation, deasphalted oils, the residues obtained from conversion processes such as for example those derived from coking, a fixed bed, boiling bed or also a moving bed hydroconversion, used individually or as a mixture. These feedstocks may advantageously be used as such or also diluted by a hydrocarbon fraction or a mixture of hydrocarbon fractions that may be selected from the products obtained from the fluid catalytic cracking (FCC) process, a light cycle oil (LCO according to the initials of the English name Light Cycle Oil), a heavy cycle oil (HCO according to the initials of the English name Heavy Cycle Oil), a decanted oil (DO according to the initials of the English name Decanted Oil), a slurry, or that can come from distillation, gas oil fractions in particular those obtained by vacuum distillation and termed according to the English terminology VGO (Vacuum Gas Oil). The heavy feedstocks may thus advantageously include cuts obtained from the coal liquefaction process, aromatic extracts, or any other hydrocarbon cut.

The process according to the invention is aimed advantageously at the hydrocarbon feedstocks containing less than 50 ppm of metals, for example nickel and vanadium.

The said heavy feedstocks generally have more than 1 wt. % of molecules having a boiling point greater than 500° C., a content of metals (Ni+V) greater than 1 ppm by weight, preferably greater than 20 ppm by weight, particularly preferably between 30 and 50 ppm by weight, a content of asphaltenes precipitated in heptane greater than 0.05 wt. %, preferably greater than 1 wt. %, particularly preferably greater than 2%.

The heavy feedstocks may advantageously also be mixed with coal in the form of powder, this mixture generally being termed a slurry. These feedstocks may advantageously be by-products obtained from the conversion of coal and remixed with fresh coal. The content of coal in the heavy feedstock is generally and preferably in a ratio of ¼ (oil/coal) and may advantageously vary widely between 0.1 and 1. The coal may contain lignite, and may be a sub-bituminous coal (according to the English terminology) or also a bituminous oil. Any other type of coal is suitable for the implementation of the invention, either in fixed bed reactors or in reactors operating as boiling bed reactors.

According to the invention, the afore-described catalyst is preferably used in the first catalytic beds of a process comprising successively at least one hydrodemetallation step and at least one hydrodesulphurisation step. The process according to the invention is advantageously carried out in one to ten successive reactors, and the catalyst or catalysts according to the invention may advantageously be charged in one or several reactors and/or in all or part of the reactors.

In the case where the process employs a hydrocarbon feedstock that is more concentrated in metals, that is to say has a cumulative content of metals (Ni+V) greater than 50 ppm, the catalyst according to the invention may be placed downstream of one or more hydrodemetallation catalysts that may be any of the catalysts described in the prior art, and known to the person skilled in the art. This or these catalysts then enable a partially hydrotreated feedstock containing less than 50 ppm of metals (Ni+V) to be available at the inlet of the catalytic bed consisting of the catalyst according to the invention.

The process according to the invention may advantageously be carried out in a fixed bed with the aim of eliminating metals and sulphur and reducing the mean boiling point of the hydrocarbons. In the case where the process according to the invention is carried out in a fixed bed, the operating temperature is advantageously between 320° C. and 450° C., preferably 350° to 410° C., under a hydrogen partial pressure advantageously between 3 MPa and 30 MPa, preferably between 10 and 20 MPa, at a space velocity advantageously between 0.05 and 5 volumes of feedstock per volume of catalyst and per hour, and with a ratio of gaseous hydrogen to liquid hydrocarbon feedstock advantageously between 200 and 5000 normal cubic meters per cubic meter, preferably 500 to 1500 normal cubic meters per cubic meter.

The process according to the invention may also advantageously be carried out in part in a boiling bed on the same feedstocks. In the case where the process according to the invention is carried out in a boiling bed, the catalyst is advantageously employed at a temperature between 320 and 450° C., under a hydrogen partial pressure advantageously between 3 MPa and 30 MPa, preferably between 10 and 20 MPa, at a space velocity advantageously between 0.1 and 10 volumes of feedstock per volume of catalyst and per hour, preferably between 0.5 and 2 volumes of feedstock per volume of catalyst and per hour, and with a ratio of gaseous hydrogen to liquid hydrocarbon feedstock advantageously between 100 and 3000 normal cubic meters per cubic meter, preferably between 200 to 1200 normal cubic meters per cubic meter.

According to a preferred embodiment, the process according to the invention is carried out in a fixed bed.

Before they are used in the process according to the invention, the catalysts of the present invention are preferably subjected to a sulphurisation treatment enabling the metallic species to be converted at least in part into sulphur, before the catalysts are brought into contact with the feedstock to be treated. This activation treatment by sulphurisation is well known to the person skilled in the art and may be carried out by any known method already described in the literature. A conventional sulphurisation method well known to the person skilled in the art consists in heating the mixture of solids in a stream of a mixture of hydrogen and hydrogen sulphide or in a stream of a mixture of hydrogen and hydrocarbons containing sulphurised molecules at a temperature between 150 and 800° C., preferably between 250 and 600° C., generally in a swept bed reaction zone.

The sulphurisation treatment may be carried out ex situ (before introducing the catalyst to the hydrotreating/hydroconversion reactor) or in situ by means of an organo-sulphur precursor agent of $H_2S$, for example DMDS (dimethyl disulphide).

The following examples illustrate the invention without however restricting its scope.

EXAMPLES

Example 1: Preparation of the Catalyst Supports A and B (According to the Invention)

The synthesis of an alumina according to the invention is carried out in a conventional arrangement with a 5 L reactor in 3 steps.

The concentration of the precursors is as follows: aluminium sulphate $Al_2(SO_4)_3$ 102 g/L of $Al_2O_3$ and sodium aluminate NaAlOO 155 g/L of $Al_2O_3$.

The alumina according to the invention is prepared according to the following steps:

a) a first co-precipitation of aluminium sulphate $Al_2(SO_4)_3$ and sodium aluminate NaAlOO at 30° C. and pH=9.1 in 8 minutes: the rate of progress is 8%. The rate of progress corresponds to the proportion of alumina formed during the first step, i.e. a final concentration of alumina of 45 g/l. If the operation is carried out in a 5 l reactor and the aim is to have 4 l of alumina suspension of final $Al_2O_3$ concentration of 45 g/l, with a target rate of progress of 8% for the first precipitation step, then 8% of the total alumina should be introduced in the precipitation step a). The precipitation pH of the first step is fixed at 9.1. The amount of water initially present in the reactor is 1330 ml.

For the first precipitation step a) operating at 30° C. and for 8 minutes, the aluminium sulphate flow rate should be 6.1 ml/min, the sodium aluminate flow rate is 7.6 ml/min and the water flow rate is 69.7 mL/min. The mass ratio of sodium aluminate to aluminium sulphate is therefore 1.91.

b) a rise in temperature from 30 to 70° C. in 20 to 30 minutes;

c) a second co-precipitation of aluminium sulphate $Al_2(SO_4)_3$ and sodium aluminate NaAlOO at 70° C. and pH=9.1 in 30 minutes, with a rate of progress of 92%; for the second precipitation step, carried out at 70° C. for 30 minutes, the precipitation pH of the second step is fixed at 9.1, the aluminium sulphate flow rate should be 19 ml/min, the sodium aluminate flow rate is 23 ml/min and the water flow rate is 24.7 mL/min. The mass ratio of sodium aluminate of aluminium sulphate is therefore 1.84.

d) filtration through a P4 fritted Buchner funnel and washing 3 times with 5 L of distilled water at 70° C.

e) drying overnight at 120° C.

f) moulding of the crude material:

The dried alumina gel is added to a Brabender type kneader. Water acidified with nitric acid to a total acid concentration of 3%, expressed in weight with respect to the mass of dried gel introduced to the kneader, is added in 10 minutes, while kneading at 20 rpm. The acidic kneading is continued for 5 minutes. A neutralisation step is then carried out by adding an ammoniacal solution to the kneader, to a degree of neutralisation of 200%, expressed in weight of ammonia with respect to the amount of nitric acid added to the kneader for the acidification step. The kneading is continued for 3 minutes.

The paste obtained is then extruded through a three-lobed 2 mm die.

g) heat treatment: the extrudates obtained are dried at 100° C. overnight, and then calcined:
   either 2 hours at 800° C. in a stream of moist air in a tubular furnace (HSV=1 l/h/g with 30% v/v water): these extrudates give the support A;
   or 2 hours at 700° C. in a stream of moist air in a tubular furnace (HSV=1 l/h/g with 30% v/v water, which leads to the extrudates of the support B.

The pore distribution of the alumina obtained is characterised by mercury intrusion porosimetry according to ASTM standard D4284-83 at a maximum pressure of 4000 bar (400 MPa), employing a surface tension of 484 dynes/cm and a contact angle of 140°.

The absence of microporosity is verified by nitrogen porosimetry.

TABLE 1

Synthesised supports

|  | A | B | C | D |
|---|---|---|---|---|
| Total pore volume (ml/g) | 0.78 | 0.74 | 0.87 | 1.02 |
| Mesopore volume (ml/g) | 0.75 | 0.71 | 0.87 | 0.81 |
| Macropore volume (ml/g) | 0.03 | 0.03 | 0.00 | 0.21 |
| % Vmacro | 4% | 4% | 0% | 21% |
| Dp meso (nm) | 20.4 | 17.6 | 15.4 | 28.4 |
| $S_{BET}$ (m$^2$/g) | 128 | 146 | 184 | 179 |

Example 2: Preparation of a Catalyst Support C (Not According to the Invention)

First of all an alumina gel not according to the invention is synthesised, in which Example 2 is carried out according to the preparation process described in U.S. Pat. No. 7,790,562.

The synthesis is carried out in a 7 L reactor and a final suspension of 5 L in 2 precipitation steps. The amount of water added to the reactor is 3960 ml.

The intended final alumina concentration is 30 g/L.

A first step of co-precipitation of aluminium sulphate $Al_2(SO_4)_3$ and sodium aluminate NaAlOO is carried out at 30° C. and pH=9.3 for 8 minutes. The concentrations of the aluminium precursors used are as follows: $Al_2(SO_4)$=102 g/L $Al_2O_3$ and NaAlOO 155 g/L of $Al_2O_3$. Stirring at 350 rpm is carried out throughout the synthesis.

A solution of aluminium sulphate $Al_2(SO_4)$ is added continuously for 8 minutes at a flow rate of 19.6 ml/min to a solution of sodium aluminate NaAlOO in a base/acid mass ratio=1.80 so as to adjust the pH to a value of 9.3. The temperature of the reaction medium is maintained at 30° C.

A suspension containing an alumina precipitate is obtained.

Since the final intended alumina concentration is 30 g/L, the flow rate of the precursors aluminium sulphate $Al_2(SO_4)$ and sodium aluminate NaAlOO containing aluminium introduced in the first precipitation step are respectively 19.6 ml/min and 23.3 ml/min.

These flow rates of acidic and basic precursors containing aluminium enable a rate of progress of 30% to be obtained at the end of the first precipitation step.

The suspension obtained then undergoes a rise in temperature from 30 to 57° C.

A second step of co-precipitation of the suspension obtained is then carried out by adding aluminium sulphate $Al_2(SO_4)$ at a concentration of 102 g/L $Al_2O_3$ and sodium aluminate NaAlOO at a concentration of 155 g/L $Al_2O_3$. A solution of aluminium sulphate $Al_2(SO_4)$ is then added continuously to the heated suspension obtained at the end of the first precipitation step for 30 minutes at a flow rate of 12.8 ml/min to a solution of sodium aluminate NaAlOO according to a base/acid mass ratio=1.68 so as to adjust the pH to a value of 8.7. The temperature of the reaction medium in the second step is maintained at 57° C.

A suspension containing an alumina precipitate is obtained.

Since the final intended alumina concentration is 30 g/L, the flow rate of the precursors aluminium sulphate $Al_2(SO_4)$ and sodium aluminate NaAlOO containing aluminium introduced in the second step of precipitations are respectively 12.8 ml/min and 14.1 ml/min. These flow rates of acidic and basic precursors containing aluminium enable a rate of progress of 70% to be obtained at the end of the second precipitation step.

The suspension obtained is then filtered through a fritted Buchner funnel and the alumina gel obtained is washed 3 times with 5 L of distilled water at 70° C.

Moulding of the Crude Material:

The dried alumina gel is added to a Brabender type kneader. Water acidified with nitric acid to a total acid content of 3%, expressed in weight with respect to the mass of dried gel introduced to the kneader, is added in 10 minutes, while kneading at 20 rpm. The acidic kneading is continued for 5 minutes. A neutralisation step is then carried out by adding an ammoniacal solution to the kneader, to a degree of neutralisation of 80%, expressed in weight of ammonia with respect to the amount of nitric acid introduced to the kneader for the acidification step. The kneading is continued for 3 minutes.

The paste obtained is then extruded through a tri-lobed 2 mm die. The extrudates obtained are dried at 100° C. overnight and then calcined for 2 hours at 600° C.

g) heat treatment: the obtained extrudates are dried at 100° C. overnight, and then calcined for 2 hours at 800° C. in a stream of moist air in a tubular furnace (HSV=1 l/h/g with 30% v/v of water).

The pore distribution of the alumina obtained is characterised by mercury intrusion porosimetry according to the ASTM standard D4284-83 at a maximum pressure of 4000 bar, using a surface tension of 484 dynes/cm and a contact angle of 140°.

The absence of microporosity is verified by nitrogen porosimetry.

Example 3: Preparation of a Catalyst Support D, According to Example B of the Patent EP1392431 (Not According to the Invention)

The synthesis of this support is carried out according to the procedure described in the patent EP 1 392 431. The aluminium sulphate and sodium aluminate are simultaneously added to a reactor so as to achieve a pH of 8.5 and the whole is heated at 80° C. for 70 minutes. The suspension obtained is filtered and washed with hot water so as to remove impurities. The paste is next kneaded for 20 minutes and then extruded through a cylindrical die of 0.9 mm diameter. The extrudates obtained are dried at 120° C. for 16 hours, and then calcined for 2 hours at 800° C.

Example 4: Preparation of the Catalysts A1, B1 (According to the Invention), C1, and D1 (Comparative)

The supports A, B, C and D were impregnated dry from a stock solution No. 1 prepared by dissolving in water molybdenum oxide, nickel hydroxide and phosphoric acid purchased from Sigma Aldrich®, so as to prepare respectively the catalysts A1, B1, C1, D1. The stock solution has the following molar concentration: 1.8 mold of phosphorus, 3.4 mold of molybdenum and 1.3 mold of nickel. The stock solution is diluted so that the various catalysts obtained from the dry impregnation of the supports have the same intended concentrations of metals, i.e. 10 wt. % of molybdenum trioxide, 1.95 wt. % nickel oxide and 2.60 wt. % of phosphorus pentoxide, which corresponds to the following molar ratios: Ni/Mo=0.38 and P/Mo=0.53. The final concentrations of the thereby prepared catalysts are summarised in the following Table.

TABLE 2

Synthesised catalysts

|  | A1 | B1 | C1 | D1 |
|---|---|---|---|---|
|  | According to the invention | | Comparison | |
| % NiO (weight) | 1.87 | 1.92 | 1.98 | 1.92 |
| % MoO$_3$ (weight) | 10.02 | 10.17 | 10.20 | 10.07 |
| % P$_2$O$_5$ (weight) | 2.64 | 2.57 | 2.53 | 2.61 |

Example 5: Residues Hydrotreating (HDT) Evaluation of the Catalysts A1, B1 Compared to the Catalysts C1, D1

The catalysts A1 and B1 prepared according to the invention, but also the comparison catalysts C1 and D1, were subjected to a catalytic test in a vigorously stirred batch reactor, using an Arabian Light RSV type feedstock (see characteristics in Table 3).

TABLE 3

Characteristics of the used Arabian Light RSV feedstock

|  |  | RSV Arabian Light |
|---|---|---|
| Density 15/4 |  | 0.9712 |
| Viscosity at 100° C. | mm2/s | 45 |
| Sulphur | wt. % | 3.38 |
| Nitrogen | ppm | 2257 |
| Nickel | ppm | 10.6 |
| Vanadium | ppm | 41.0 |
| Aromatic carbon | % | 24.8 |
| Conradson carbon | wt. % | 10.2 |
| C7 Asphaltenes | wt. % | 3.2 |
| SARA | wt. % |  |
| Saturated compounds |  | 28.1 |
| Aromatics | wt. % | 46.9 |
| Resins | wt. % | 20.1 |
| Asphaltenes | wt. % | 3.5 |
| Simulated distillation |  |  |
| PI | ° C. | 219 |
| 5% | ° C. | 299 |
| 10% | ° C. | 342 |
| 20% | ° C. | 409 |

TABLE 3-continued

Characteristics of the used Arabian Light RSV feedstock

|  |  | RSV Arabian Light |
|---|---|---|
| 30% | ° C. | 463 |
| 40% | ° C. | 520 |
| 50% |  | 576 |
| DS: PF ° C. | ° C. | 614 |
| DS: res disti | wt. % | 57 |

To carry out the test, after an ex situ sulphurisation step by circulating a H$_2$S/H$_2$ gaseous mixture for 2 hours at 350° C., 15 ml of catalyst is charged in the absence of air to the batch reactor and then covered with 90 mL of feedstock. The employed operating conditions are then as follows:

TABLE 4

Operating conditions employed in the batch reactor

| Total pressure | 9.5 MPa |
| Test temperature | 370° C. |
| Duration of the test | 3 hours |

At the end of the test the reactor is cooled and after a triple stripping of the atmosphere under nitrogen (10 minutes at 1 MPa), the effluent is collected and analysed by X-ray fluorescence (for sulphur and metals) and by simulated distillation (ASTM D7169).

The HDS level is defined as follows:

HDS (%)=((wt. % S)feedstock−(wt. % S)formulation)/(wt. % S)feedstock×100

In the same way the HDM level is defined as follows:

HDM (%)=((ppm weight Ni+V)feedstock−(ppm weight Ni+V)formulation)/(ppm weight Ni+V) feedstock×100

The performances of the catalysts are summarised in Table 5.

TABLE 5

HDS and HDM performances of the catalysts A1, B1 compared to the catalysts C1, D1

| Catalysts | HDS (%) | HDM (%) |
|---|---|---|
| A1 (according to the invention) | 48.5 | 81.8 |
| B1 (according to the invention) | 50.8 | 83.1 |
| C1 (comparison) | 50.2 | 70.2 |
| D1 (comparison) | 44.1 | 74.9 |

It can be seen from Table 5 that the use of the catalysts of the present invention leads to a significant gain in hydrodemetallation HDM that is never observed in the different textures of the prior art. The differences in hydrodesulphurisation HDS also however negligible.

Example 6: Fixed-Bed Hydrotreating Evaluation of the Catalysts A1, B1 According to the Invention and Comparison with the Catalytic Performances of the Catalyst C1

The catalysts A1 and B1 prepared according to the invention were compared in a hydrotreating test of petroleum residues by comparison with the performance of the catalyst C1. The feedstock consists of a mixture of an atmospheric residue (AR) of Middle East origin (Arabian medium) and a vacuum residue (Arabian light) that was previously hydrotreated by a commercial hydrodemetallation catalyst. The feedstock is characterised by high levels of Conradson carbon (9.6 wt. %) and asphaltenes (2.1 wt. %) and an amount of nickel of 21 wt. %, an amount of vanadium of 10 wt. % and an amount of sulphur of 2.25 wt. %.

The full characteristics of the feedstock used are shown in Table 6.

TABLE 6

Characteristics of the feedstock used for the tests

| | | Hydrotreated RA AM/RSV AL Mix |
|---|---|---|
| Density15/4 | | 0.9610 |
| Sulphur | wt. % | 2.25 |
| Nitrogen | ppm | 2300 |
| Nickel | ppm | 21 |

TABLE 6-continued

Characteristics of the feedstock used for the tests

| | | Hydrotreated RA AM/RSV AL Mix |
|---|---|---|
| Vanadium | ppm | 10 |
| Conradson carbon | wt. % | 9.6 |
| C7 Asphaltenes | wt. % | 2.1 |
| Simulated distillation | | |
| PI | ° C. | 193 |
| 10% | ° C. | 378 |
| 25% | ° C. | 453 |
| 50% | ° C. | 549 |
| 65% | ° C. | 601 |
| 66% | ° C. | 605 |
| 67% | ° C. | 609 |
| 68% | ° C. | 614 |

After a sulphurisation step by circulating in the reactor a gas oil cut to which DMDS has been added at a final temperature of 350° C., the unit is operated with the mixture of the above feedstocks above under the operating conditions of Table 7.

TABLE 7

Operating conditions used in the fixed-bed reactor

| Total pressure | 15 MPa |
|---|---|
| Test temperature | 370° C. |
| Hourly space velocity of the residue | 1.2 h-1 |
| Hydrogen flow rate | 1200 std l. H2/l. feedstock |

Figure 2:
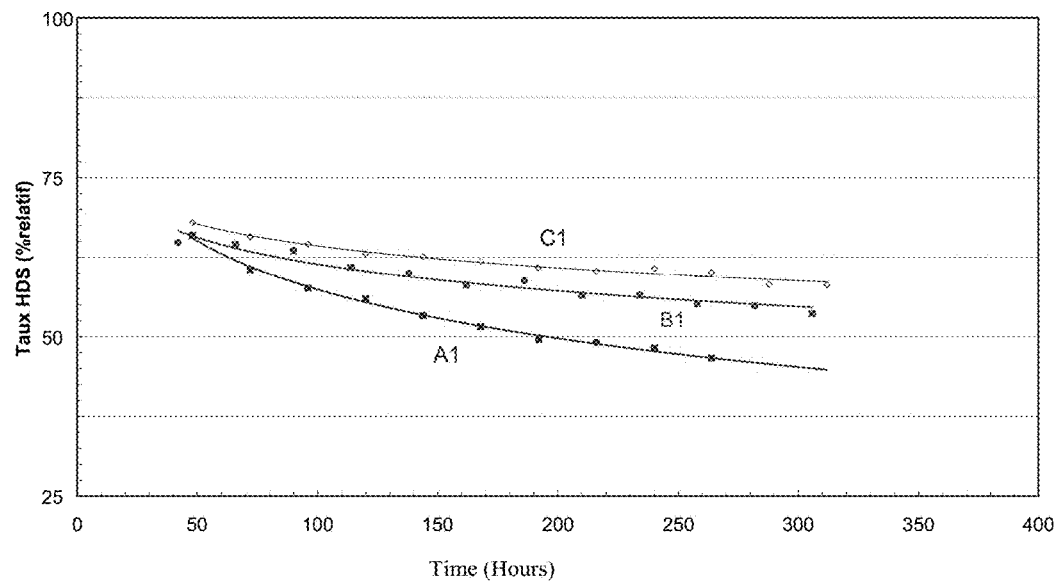
FIG. 2 shows the evolution at 300 hours of the relative hydrodesulphurisation HDS performances of the catalysts A1, B1, and C1 on a feedstock comprising a mixture of atmospheric residue and vacuum residue (RAAM/RSVAL, previously hydrotreated).

The feedstock is injected and the test temperature is then raised. After a stabilisation period of 300 hours, the hydrodesulphurisation (HDS) and hydrodemetallation (HDM) performances are recorded, as well as the hydroconversion of the RSV vacuum residue (540° C.+ cut). Next, the performances are presented as relative conversions with respect to the reference (set at zero in Table 8) or on a relative scale in which the activity is standardised to 100 (arbitrarily) in FIGS. 1 and 2.

The results of Example 5 are confirmed, that is to say the improvement of the hydrodemetallation HDM performances of the catalysts according to the invention compared to the reference catalyst C1. The gain with respect to the catalyst C1 is 2 to 3 ppm less metal in the effluent, which represents a considerable improvement for the refinery operator. This gain is furthermore achievable with a sulphur content in the effluent that remains fairly close to that obtained with the catalyst C1.

TABLE 8

Hydrodesulphurisation HDS and hydrodemetallation HDM performances of the catalysts A1, B1, and C1 at 300 hours in a fixed bed

| | HDS | | HDM | |
|---|---|---|---|---|
| Catalyst | % converted | % S effluent | % converted | ppm metals in effluent |
| A1 (according to invention) | Base − 13% | Base + 0.29% | Base + 8% | Base − 3 ppm |
| B1 (according to invention) | Base − 4% | Base + 0.09% | Base + 12% | Base − 2 ppm |
| C1 | Base | Base | Base | Base |

The invention claimed is:

1. A process for preparing a hydroconversion catalyst, which comprises:
    a mainly aluminum oxide calcined support;
    a hydro-dehydrogenating active phase comprising at least one metal of group VIB of the periodic classification of the elements, optionally at least one metal of group VIII of the periodic classification of the elements, and optionally phosphorus,
    and said catalyst having:
        a Sbet specific surface greater than 75 $m^2/g$,
        a total pore volume measured by mercury porosimetry greater than or equal to 0.55 ml/g,
        a median mesopore volume diameter greater than or equal to 16 nm,
        a mesopore volume as measured by mercury intrusion porosimetry greater than or equal to 0.50 ml/g, and
        a macropore volume less than 15% of the total pore volume;
    the said process comprising at least the following steps:
    a) a first precipitation step, in an aqueous reaction medium, of at least one basic precursor selected from sodium aluminate, potassium aluminate, ammonia, sodium hydroxide and potassium hydroxide, and at least one acidic precursor selected from aluminum sulphate, aluminum chloride, aluminum nitrate, sulfuric acid, hydrochloric acid and nitric acid, in which at least one of the basic or acidic precursors comprises aluminum, the relative flow rate of the acidic and basic precursors being selected so as to obtain a pH of the reaction media between 8.5 and 10.5 and the flow rate of the acidic and basic precursor or precursors containing aluminum is regulated so as to obtain a rate of progress of the first step of between 5 and 13%, the rate of progress being defined as the proportion of alumina formed as $Al_2O_3$ equivalent during the first precipitation step with respect to the total amount of alumina formed as $Al_2O_3$ equivalent at the end of the step c) of the preparation process, the said step operating at a temperature between 20 and 90° C. and for a period of between 2 minutes and 30 minutes;

b) a heating step of the resultant suspension at a temperature between 40 and 90° C. for a period of between 7 minutes and 45 minutes, c) a second precipitation step of the suspension obtained at the end of the heating step b) by adding to the suspension at least one basic precursor selected from sodium aluminate, potassium aluminate, ammonia, sodium hydroxide and potassium hydroxide, and at least one acidic precursor selected from aluminum sulphate, aluminum chloride, aluminum nitrate, sulfuric acid, hydrochloric acid and nitric acid, in which at least one of the basic or acidic precursors includes aluminum, the relative flow rate of the acidic and basic precursors being selected so as to obtain a pH of the reaction media between 8.5 and 10.5 and the flow rate of the acidic and basic precursor or precursors containing aluminum is regulated so as to obtain a rate of progress of the second step between 87 and 95%, the rate of progress being defined as the proportion of alumina formed as $Al_2O_3$ equivalent in the said second precipitation step with respect to the total amount of alumina formed as $Al_2O_3$ equivalent at the end of the step c) of the preparation process, the said step operating at a temperature between 40 and 90° C. and for a period between 2 minutes and 50 minutes;

d) a filtration step of the suspension obtained at the end of the second precipitation step c) so as to obtain an alumina gel;

e) a drying step of the said alumina gel obtained in stage d) in order to obtain a powder;

f) a moulding of the powder obtained at the end of the step e) so as to obtain a crude material;

g) a heat treatment step of the crude material obtained at the end of the step f) at a temperature between 500 and 1000° C., in the presence or otherwise of a stream of air containing up to 60% by volume of water, in order to obtain an aluminum oxide support; and h) an impregnation step of the hydro-dehydrogenating active phase on the aluminum oxide support.

2. The process according to claim 1, in which the rate of progress of the first precipitation step a) is between 6 and 12%.

3. The process according to claim 1, in which the rate of progress of the first precipitation step a) is between 7 and 11%.

4. The process according to claim 1, in which the basic precursor is sodium aluminate.

5. The process according to claim 1, in which the acidic precursor is aluminum sulphate.

6. The process according to claim 1, in which in the first precipitation step the aqueous reaction medium is water and said step is carried out while stirring, in the absence of an organic additive.

7. The process according to claim 1, wherein the catalyst has:
- a $S_{BET}$ specific surface greater than 100 m²/g,
- a median mesopore volume diameter greater than or equal to 18 nm,
- a mesopore volume as measured by mercury intrusion porosimetry of between 0.55 ml/g and 0.85 ml/g,
- a total pore volume measured by mercury porosimetry greater than or equal to 0.60 ml/g,
- a macropore volume less than 10% of the total pore volume, and
- an absence of micropores.

8. The process according to claim 1, wherein the catalyst has a macropore volume less than 5% of the total pore volume.

9. The process according to claim 1, wherein the catalyst has a median mesopore volume diameter determined by mercury intrusion porosimetry of between 20 and 25 nm.

10. The process according to claim 1, wherein the hydro-dehydrogenating active phase has the content of metal of group VI B of between 6 and 14 wt. % of trioxide of metal of group VI B with respect to the total mass of the catalyst, the content of metal of group VIII of between 0.0 and 5.0 wt. % of the oxide of metal of group VIII with respect to the total mass of the catalyst, and the content of the element phosphorus of between 0 to 7 wt. % of phosphorus pentoxide with respect to the total mass of the catalyst.

11. The process according to claim 1, wherein the hydro-dehydrogenating active phase is composed of molybdenum or nickel and molybdenum or cobalt and molybdenum.

12. The process according to claim 11, wherein the hydro-dehydrogenating active phase also includes phosphorus.

13. The process according to claim 1, wherein step a) is carried out at the pH between 8.7 and 9.9.

14. The process according to claim 1, wherein step a) is carried out at a temperature between 30 and 50° C.

15. The process according to claim 1, wherein step b) is carried out at a pH between 8.7 and 9.9.

16. The process according to claim 1, wherein the heating step b) is carried out at a temperature between 40 and 65° C.

17. The process according to claim 1, wherein the heating step b) is carried out for a period of between 7 and 35 minutes.

18. The process according to claim 1, in which the rate of progress of step b) is between 88 and 94%.

19. The process according to claim 1, in which the rate of progress of step b) is between 89 and 93%.

20. The process according to claim 1, in which the second precipitation step is carried out while stirring, in the absence of an organic additive.

* * * * *